United States Patent Office 2,777,867
Patented Jan. 15, 1957

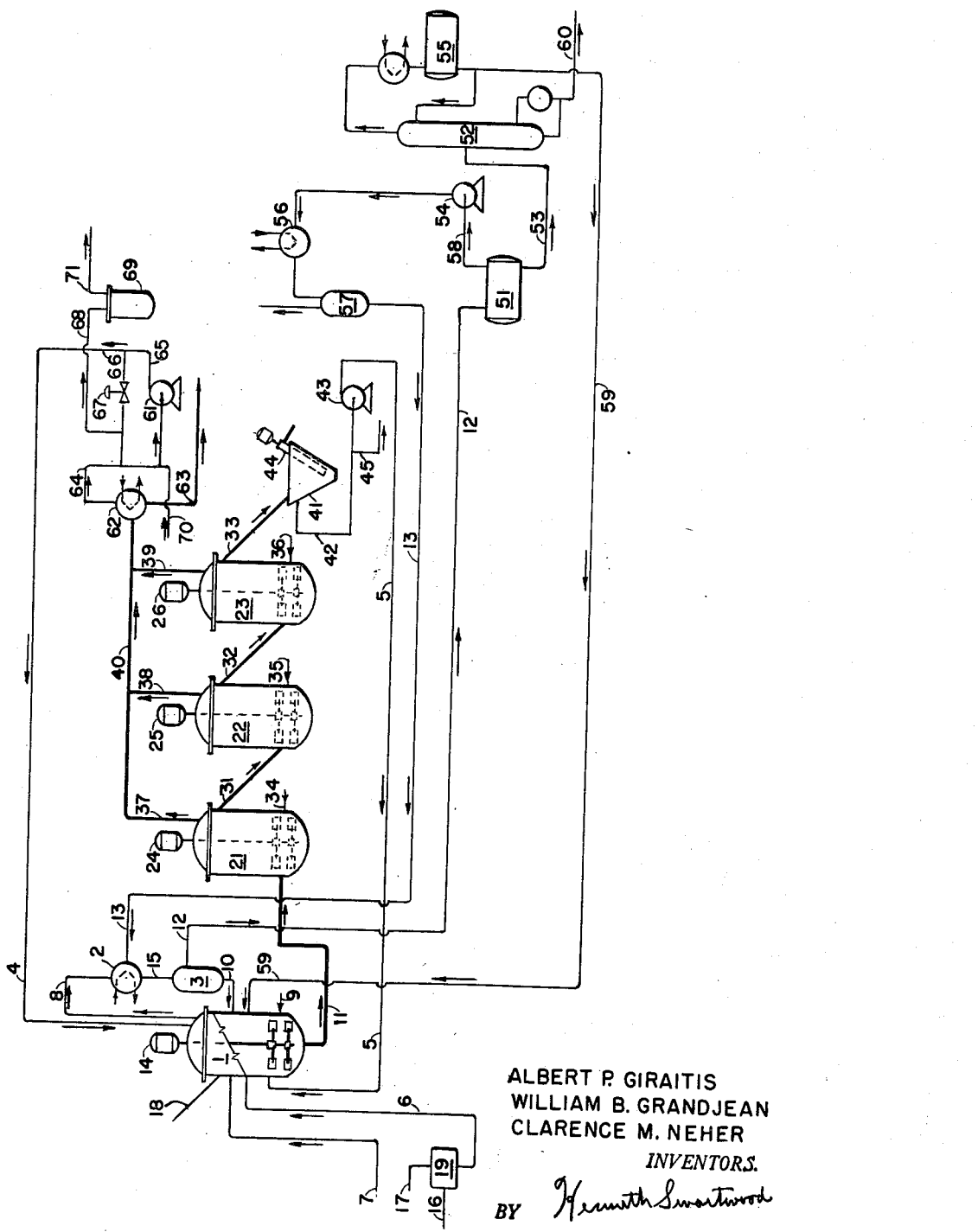
ALBERT P. GIRAITIS
WILLIAM B. GRANDJEAN
CLARENCE M. NEHER
INVENTORS.
BY Kenneth Swartwood
ATTORNEY.

2,777,867
RECOVERY OF ALKYLLEAD COMPOUNDS

Albert P. Giraitis, William B. Brandjean, and Clarence M. Neher, Baton Rouge, La., assignors to Ethyl Corporation, New York, N. Y., a corporation of Delaware Application August 3, 1953, Serial No. 371,975

9 Claims. (Cl. 260—437)

This invention relates to the manufacture and recovery of alkyllead compounds. More specifically, the invention relates to a new and improved process for the continuous recovery of an alkyllead compound from a reaction mixture characterized by having a large amount of excess alkyl chloride alkylating agent therein, besides the normally found product components of a reacted mixture. Typical products to which the process is applicable are tetraethyllead, tetramethyllead, diethyldimethyllead, tetraisopropyllead, and the like.

In the past, organo lead compounds of the above character have been produced by reacting an alkali metal alloy of lead and an alkyl chloride as alkylating agent in a closed autoclave under pressure. Normally the components of the reaction have been in such proportion that the reaction product mixture resembles a granular, dry, mass. Although an excess of alkylating agent is employed, the excess is not so great that a substantial liquid phase is left in the completed reaction mixture. Such "dry" or semi-dry reaction mixtures were normally segregated into desired materials by a steam distillation process involving immersion of the mixture in a pool of water and steam distilling the tetraalkyllead compound.

A highly improved and continuous process has, however, been developed, characterized by a very large excess of liquid alkylating or ethylating agent. Such a process, although superficially a step backward in that a much larger excess of reactant is employed, nevertheless, imports numerous advantages into the ethylating operation itself. The reaction mixture so produced by such a continuous process is a thin slurry of reacted solids, a solution of the tetraalkyllead being formed in the excess alkylating chloride. As an example of the proportions of reactants employed in the preparation of tetraethyllead from a mono-sodium lead alloy, ethyl chloride is introduced into the ethylating system in the weight proportions of for example 2:1, 4:1, or even greater than 4:1, ethyl chloride to alloy. These proportions correspond to a large excess over stoichiometric requirements— a 4:1 ratio providing, for example, a 1300 percent excess. A slurry reaction mixture produced using a 4:1 feed ratio contains approximately 7 weight percent tetraethyllead dissolved in ethyl chloride, about 14 weight percent excess lead and 5 weight percent sodium chloride. The isolation of tetraethyllead from this reaction mixture poses a peculiar problem in that a four-fold separation is essential. Separation is required of the excess ethylating liquid, the tetraethyllead, and the soluble solids (principally sodium chloride) from insoluble components (principally finely divided lead) in the mixture. The separation of the sodium chloride and the lead is quite necessary because in subsequent metal recovery operations the sodium chloride, if allowed to remain with the lead is responsible for attack of refractories employed in the smelting operations. In addition to the foregoing, the recovery problem is more accentuated because of the large amount of excess ethylating mixture which must be recovered in contrast to the only trace amounts in the normal solid reaction mixtures previously produced, the trace amounts in such instances being largely recovered from the reaction vessel itself upon completion of the batch reaction.

Mixtures of the above described character thus differ from mixtures heretofore passed to recovery systems. Not only is an additional separation required for recovery of the ethyl chloride, but this component to be so recovered is present in extremely large excess. It would therefore be expected that any separation and recovery operation would be exceedingly complex and costly compared to prior operations. A particular disadvantage in the recovery of an alkyl chloride of lower molecular weight is that refrigeration is normally considered an essential adjunct for distillation operations, and refrigeration incurs a heavy economic burden on recovery operations.

It is, therefore, an object of our invention to provide an operable and efficient process for the resolution of product mixtures containing a desired tetraalkyllead and also including a large proportion of a liquid alkyl chloride excess alkylating agent. A further object is to provide such a process while avoiding the necessity of expensive refrigeration equipment and refrigerant systems. An additional object is to provide a process capable of fully continuous operation.

A further object is to provide a process for the manufacture and recovery of tetraalkyllead wherein the aforementioned benefits of a large excess of alkyl chloride are realized. A further object is to provide an improved method of separating a tetraalkyllead from the excess and finely divided lead resultant from the formation reaction. Yet another object is to provide an improved and highly effective antiagglomerant for the excess lead particles which are a component of reaction mixtures. A further object is to provide an improved steam distilling technique, particularly suitable for the continuous separation of a tetraalkyllead associated with very finely divided high surface particles of lead produced by an alkylation reaction.

The foregoing and other objects are fully attained by the present process which includes two main steps for effecting the four-fold separation referred to above. The steps of the process include generally a first step, termed the vaporizing step and a second step, termed the steam distilling step. The vaporizing step is carried out at a substantially elevated pressure which corresponds generally to about one-half the pressure at which the preceding alkylation reaction is carried out. This pressure of the vaporizing operation is appreciably above the pressure at which the steam distilling step is performed, the latter phase of the operation being at substantially atmospheric pressure. The vaporizing step is preferably carried out in the presence of one or more recycled streams from subsequent portions of the recovery process. The recycle streams are advantageous in the continuous embodiments of the invention, providing certain ancillary advantages. However, the invention is not so restricted and the principal benefits of the process are attained even in cyclic or batchwise operations. The recycle streams referred to above can include a recycle alkali chloride water solution. Another particularly desirable recycle stream is a recompressed vapor mixture comprising alkyl chloride in admixture with liquid water. The steam distilling step is further characterized in the continuous embodiments of the process by an improved technique which provides a particular benefit with respect to efficiency of separation.

The process is described in more detail hereafter and illustrated by the example. The working example is a continuous embodiment of the process with reference to the drawing, which is a schematic process flow diagram showing apparatus for such an embodiment.

As above stated, the vaporizing step involves vaporization of the excess alkyl chloride of the slurry feed at a substantially higher pressure than in the subsequent steam distilling step. The pressure employed in a specific situation will vary slightly according to the composition characteristics of the alkylation slurry feed. However, generally it is found that an operating pressure at approximately the mid point between the pressure of the preceding alkylation step provides the results desired. For example, in carrying out an alkylation at a pressure of 90 to 100 pounds per square inch gage, the vaporizing step is then performed at 40 to about 60 pounds per square inch gage. Carrying out the vaporizing step in this manner assures that a relatively sharp separation of the alkyl chloride excess is provided, while minimizing concurrent vaporization of the tetraalkyllead at this point. Generally, the vaporizing temperature is substantially the same as the temperature of the preceding alkylation step.

The heat necessary for the vaporizing operation may be provided directly by a heating medium passed through a jacket on the vaporizer vessel. However, it has been discovered that direct heating by means of introduction of steam into the slurry is particularly effective. The steam is introduced at a relatively limited rate, so that the proportion of uncondensed steam passing through the unit in the vapor phase is minimized. Accordingly, the steam releases the heat and concurrently affects a relatively sharp separation of the volatile alkyl chloride from the slurry mixture. The condensed steam provides a substantial proportion of an aqueous phase which is utilized to facilitate transport of the undissolved components from the vaporizing zone and to and through subsequent treating zones.

The vaporizing operation is also characterized by the introduction of a solids treating agent, usually an aqueous solution for convenience. A relatively large number of such treating agents can be employed, their function being antiagglomerants to minimize "balling-up" of the finely divided lead particles during the agitation. Among the suitable antiagglomerants are sodium thiosulphate, as described in U. S. Patent 2,004,160, or soluble iron salts such as disclosed in the U. S. Patent 2,513,654. Combinations of soluble iron salts with sodium thiosulphate are also particularly effective, as is shown in U. S. Patent 2,513,659. In the continuous embodiments of the process, however, wherein a steady flow of the solid containing liquids through the several units or steps of the process is essential, a particularly effective antiagglomerant is sodium dichromate, $Na_2Cr_2O_7$, in providing this flowability which is so necessary. The sodium dichromate, in virtually all cases, is employed in the proportions not less than about 0.8 pound sodium dichromate per 100 pounds of lead metal being processed.

In continuous embodiments of the process the proportions of aqueous liquid phase with respect to the finely divided lead and metal present are controlled at a higher level than in cyclic operations. It has been found that the proportions of aqueous liquid phase should, in all instances be at least two parts by weight to one part of the insoluble lead solids present. By aqueous liquid is meant the aqueous solution of alkali chloride formed by leaching of such salt by-products of the alkylation reactors. Although a weight ratio of only slightly above two parts of such a solution to one part of lead solids is fully adequate in batch or cyclic embodiments of the process, in the continuous embodiments, the corresponding proportions should be at least four parts of solution to one part of lead. These proportions are necessary to provide free flowing characteristics for easy transport from the vaporizer to subsequent distillation operations. This ratio is also maintained during the succeeding distillation operations, particularly when the distillation is carried out in a plurality of steps.

In all forms of the invention the relatively high operating pressure of the vaporizing step and the condensation operation associated with it is particularly beneficial in that ordinary cooling water can successfully be employed in the condenser. In addition, this pressure allows convenient purification and recycle, to the preceding alkylation operations of the alkyl chloride liquid so recovered. A favorable feature of the operation is that the quantities of alkyl lead associated therewith can be left in the recycle stream upon its return to the reaction section, even though ordinarily the presence and subjection of an alkyl lead compound to reaction temperatures is minimized.

In addition to the separation of the major portion of excess alkylating liquid in the vaporizing step, the alkali chloride is dissolved by the aqueous phase present. The aqueous phase as heretofore indicated is generally made up of a recycled aqueous solution, condensed steam, and varying amounts of added water. The stream discharged by the vaporizer to the subsequent steam distillation operation is therefore a mixture of excess finely divided lead, tetraalkyllead, and alkali metal chloride in aqueous solution.

The next step in the process is steam distilling the tetraalkyllead from its association with finely divided lead particles. The steam distillation is carried out at substantially atmospheric pressure. Steam is passed through the system at a relatively high rate while agitating vigorously. Generally the rate of steam flow is controlled so that its superficial velocity does not exceed one foot per second.

As heretofore indicated, the steam distilling step, as well as the vaporizing step, can be carried out in an intermittent as well as a fully continuous manner. In all cases the proportions of aqueous solution with respect to the solid lead particles is maintained at approximately the ratio provided in the preceding vaporizing step. The limiting ratio is at least enough aqueous solution to provide approximately twice the weight of solution as undissolved solids present. In the continuous embodiments of the operation, however, it is found that an appreciably higher liquid:solid weight ratio is highly desirable. A liquid:solid ratio of at least 4:1 is then maintained. When employing such high liquid:solid proportions, the agitation provided is restricted to a level short of the agitation which provides uniform mixing. Thus, although all the solids present are maintained in discreet separated distribution in the liquid phase, a nonuniform over all distribution according to vertical height is achieved. It is found that by maintaining a nonuniform distribution that both a chemical and a weight disproportionation is affected. Thus, a continuous operation affords the possibility of removal from the distilling zone of the solids which are more highly denuded of associated tetraalkyllead than the average solids within the said zone. This phenomenon is of particular advantage in embodiments characterized by a plurality of stages comprising the distilling zone. Generally, it is preferred to provide from two to four discreet stages for the steam distilling step, these stages being connected in a series sequence.

To illustrate the above described non-uniform weight distribution, the following data are typical. Samples were obtained from the first stage of a multi-stage steam distilling zone. These samples were taken at points designated as the one-third and two-third levels, these being the vertical height from the bottom of the distillation as a fraction of the total height. The weight ratio of salt solution:lead solids was 2.8:1.0 at the one-third level and 2.16:1.0 at the two-thirds level, these showing the weight concentration gradient. The corresponding ratio of the feed to the steam distilling stage was, in this instance, 4:1 and approximately the same ratio was provided in the discharge from this stage.

The non-uniform distribution of the components of the steam distillation is illustrated by the results of analyses of a series of samples from the above described one-third and two-thirds levels. From a series of eleven sets of samples, it was found that the average proportion of tetraethyllead at the one-third level was 4.8 parts per 100 parts of lead. The concentration at the two-thirds level was 4.2 parts per 100 parts, showing an actual decrease, in tetraethyllead content, of about 12 percent.

In the operation in which the above data were obtained, the weight and composition distribution was, even more marked by comparison of these attributes in the inlet and outlet slurry streams to this stage. The ratio of aqueous solution:lead in the feed and in the discharge stream was as noted above, about 4:1 in both cases. The proportions of tetraethyllead to lead were about 36 parts of tetraethyllead per 100 parts of lead in the feed and about two parts of tetraethyllead per 100 parts of lead in the discharge slurry, which was withdrawn as an overflow stream. From the foregoing it is apparent that the non-uniform weight and composition distribution above described facilitates and improves the efficiency of separation achieved in the continuous operation of the steam distilling step. The fullest utilization of this phenomenon is obtained by withdrawing from each stage at the top of the contents. However, as illustrated by the foregoing data, benefits in less degree are provided by discharging at any point remote from the bottom that is, for example, at any point in the upper two-thirds of the vertical height.

In all forms of the distillation, the resultant liquid-solid slurry consists of an aqueous alkali chloride solution having the lead particles distributed therein. The steam, in passing through the charge, vaporizes the tetraalkyllead product desired as above described and also residual minor amounts of alkyl chloride plus minor quantities of alkane hydrocarbons.

The overhead from the distillation operation thus includes vaporized tetraalkyllead, steam, and relatively minor quantities of the alkyl chloride plus volatile hydrocarbon components. Owing to the high liquefaction temperature of the tetraalkyllead, this stream can be effectively condensed with ordinary water cooling except for portions of the alkyl chloride and volatiles. The discharge from the condenser then is a partly liquefied stream. The stream is passed to a separating space for a sufficient period of time to form a liquid alkyllead layer, an aqueous layer, and a non-condensed gas phase. The non-condensed gas contains virtually all the residual alkyl chloride. This stream is compressed to a pressure somewhat above the operating pressure of the vaporizer 1 and is returned to the vaporizing operation. This combination of vaporizing and distilling steps at the several conditions described eliminates the need for refrigerants. In addition, by conducting the vaporizing-condensing operation at high pressure, the compression load to permit normal water cooling is reduced to a factor of approximately 30. The tetraalkyllead phase isolated in the separatory drum is transmitted to subsequent purification operations as a stream of over 99 percent purity.

It is usually found necessary that, during compression, this vapor stream also be heated to prevent liquefaction. In certain embodiments of the process, it has been found highly advantageous to provide this heat by compressing in the presence of a preheated water stream, thereby establishing a mixed liquid-vapor stream. Such a compression is suitably carried out in compressors employing a circulating ovoid body of liquid, these compressors being commonly known as "Nash" compressors. The use of preheated water in this construction thus utilizes the water in a dual function, that is preventing condensation of the alkyl chloride and also acting as the necessary make up stream for water required in the vaporizing step. As a typical example, water preheated to 160–170° F. is added to the vapor stream (the vapor containing 94 percent by weight ethyl chloride) in the proportions of about 7 to 7.5 parts of water by weight to one part of vapor.

The streams from the distillation operation include the above described overhead components as well as a slurry consisting essentially of finely divided lead in aqueous alkali chloride solution. Owing to the relatively high liquid-solid proportions provided throughout, the lead component is rapidly settled in a subsequent settling operation. The settling operation provides a clarified alkali chloride or brine stream which is usually returned in part to the above described vaporizing step, particularly when a high proportion of liquid to solid is desired. At least a portion of the stream, containing alkali chloride equivalent to that introduced with the feed stream, is discarded. The recycled solution is beneficial in several respects in the vaporizing operation. The presence of the alkyl chloride provides for higher temperature of operation thus facilitating the sharpness of separation of the alkyl chloride, and also the solution provides a portion of the necessary liquid to solid ratio necessary for easy transmittal through the lines.

The settled lead solids are removed from the settling operation, dried, and passed to smelting operations for recovery and re-use of the lead metal.

As heretofore explained, the process is applicable to both cyclic operations and to continuous operations. Certain ancillary advantages are obtained in the continuous embodiments to which the process is particularly applicable. The apparatus for a typical continuous embodiment is shown schematically by the drawing.

Referring to the figure, the principal apparatus units are the vaporizer 1 and a plurality of stills 21, 22, 23. Externally driven agitator assemblies 14, 24, 25, 26 are provided, the agitators preferably being of the turbine type. A line 18 is provided to feed a reaction slurry to the vaporizer 1 from the preceding reaction section. Additional inlet lines to the vaporizer include an antiagglomerant feed line 6, a recycle brine line 5, and a steam line 9. Another feed line 7 is provided for introducing thermally stabilizing additives. Discharge lines from the vaporizer 1 include a slurry discharge line 11, which provides for transmittal of the treated lead and tetraalkyllead containing slurry to the first of the plurality of steam stills 21. Another discharge line from the vaporizer is the overhead vapor line 8.

A condenser 2 is provided for receiving and condensing vapors produced in the vaporizer 1. A condensate separatory drum 3, and lines therefrom 12, 10 provide for separate withdrawal of the liquid alkyl chloride layer and an aqueous layer.

Slurry from the vaporizer 1 is received through line 11 by the first steam still 21. Discharge lines 31, 32, 33 from each steam still provide for transmittal of a discharge slurry stream to the next succeeding still, or in the case of the last still 23, to the lead settling pit 41.

The steam stills 21, 22, 23, produce overhead vapors which are transmitted by vapor lines 37, 38, 39 to a manifold line 40 which feeds the vapor to a condenser 62. The condenser 62 accomplishes only a partial condensation, separate discharge lines being provided for both liquid condensate 63 and non-condensed vapor 64. The vapor line 64 is joined by a seal water line 70 and feeds a compressor 61. A compressor discharge line 65 branches into a by-pass line 66, a control valve 67 being located in the by-pass line for controlling the amount of material released. A vent line 68, having a liquid seal drum 69, allows venting of a portion of the compressor discharge products to maintain a standard pressure on the system through a final vent 71. A recycle line 4 feeds a major portion of the compressor discharge to the vaporizer 1.

Supplemental recovery equipment includes a fractionating column 52. Auxiliary equipment to this column includes a feed drum 51, a compressor 54, a condenser 56 and a separatory drum 57. This section is connected to the vaporizing section by a line 12, which is provided to transmit condensate from the vaporizer condenser separatory drum 3 to the feed drum 51 for the column 52. A relatively small stream of vapors is vented by a line 58 to a compressor 54, which compresses the vapors to a sufficiently elevated pressure level to provide for return to the vaporizer condenser 2 through line 13. The condenser 56 effects a partial condensation of the compressed gas, the liquid phase being separated from gaseous components in the separatory drum 57 and fed to line 13.

The feed drum 51 is connected to the column 52 by feed line 53. A reflux drum 55 is fitted with a line 59 for return in part, as necessary, of reflux liquid to the vaporizer 1.

As heretofore mentioned, the last steam still 23 is connected to a lead settling pit 41 by a slurry line 33. The lead settling pit is provided with a deliquefying conveyor 44 which discharges drained lead solids to subsequent drying and smelting operations.

An overflow line 42 transmits liquid from the settling pit 41 to a recycle pump 43. The recycle pump discharges through a return line 5, which delivers liquid to the vaporizer 1. A branch ditch line 45 allows discharge of a waste stream.

*Example*

To illustrate a preferred embodiment of the process more specifically, the following describes a working example of its application in the recovery of tetraethyllead in a slurry produced in the reaction of mono-sodium lead alloy and ethyl chloride. Quantities cited hereafter are in parts by weight per hour. Compositions, except where otherwise expressed, are in percent by weight.

A slurry is introduced to the vaporizer 1 through the feed line 18, consisting of 3,400 parts of reaction mixture at a temperature of approximately 175° F. and a pressure of 90 to 100 pounds. The reaction mixture includes 70 percent ethyl chloride, 14 percent lead, 7.1 percent tetraethyllead, and about 5 percent sodium chloride produced as a by-product of the ethylation reaction. In addition, the feed also contains approximately 4 percent of volatile hydrocarbons, including isobutane, butane, pentane, and ethylene, and a very minor amount of unreacted sodium. In addition to the foregoing principal feed stream, a recirculated stream is introduced through line 4 from a point hereafter defined. This recirculated stream is very beneficial to the economy of the process and amounts to approximately 580 parts. The stream includes both vapor and liquid components and contains approximately 88 percent water and 11 percent ethyl chloride. An additional stream to the vaporizer is a recirculated sodium chloride solution added through line 5, which contains over 10 percent sodium chloride and amounts to 700 parts.

In operation of the vaporizer, the agitator 14 is of course operated and steam is introduced through line 9 in the proportions of 520 parts.

The vaporizer is operated at approximately the same temperature range as the preceding reaction section, for example, at approximately 175° F. The pressure of operation is maintained at the relatively high level of 50 to 60 pounds per square inch gage, but sufficiently below the preceding ethylation section pressure to admit of vaporizing a concentrated ethyl chloride vapor with only minor amounts of tetraalkyllead. The steam admitted through line 9 is passed in at such a rate and with a sufficiently intense agitation that virtually all the steam is immediately condensed and consequently the overhead vapor, discharged through the overhead line 8 to condenser 2, consists to a very large extent of the ethyl chloride with only negligible quantities of water vapor. Thus, the composition of the overhead stream is 90 percent ethyl chloride plus the above referred to hydrocarbon components which amount to over 5 percent. Only minor quantities of tetraethyllead and water are present in this vapor, which is condensed in the condenser 2 at a temperature of about 120–140° F. The condensate is passed through a line 15 to a liquid separatory drum 3. Here the small amount of entrained water is separated and returned through line 10 to the vaporizer 1. The organic layer comprising liquid ethyl chloride, saturated with water and containing approximately one percent or less of tetraethyllead is passed through line 12 to the feed drum 51 for the recovery column 52.

In addition to the above described streams to the vaporizer, a continuous supply of antiagglomerating solution of sodium dichromate or similar treating agent is introduced through line 6. The said dichromate solution is made up in drum 19 by mixing water, added through feed line 16, and solid sodium dichromate fed through line 17. The antiagglomerant is provided in proportions of about 0.8 to 1.0 part per 100 parts of lead metal. A thermally stabilizing material can, if desired, be added to the vaporizer 1 through line 7.

The resulting time in the vaporizer is relatively brief, being of the order of 5 to 10 minutes for the solid particles present. In the vaporizer operation, as already mentioned, ethyl chloride is removed to a high degree from the feed slurry but the tetraethyllead component is successfully retained in the slurry mixture and is associated with undissolved lead particles. The discharge slurry from the vaporizer is passed to a first steam still through line 11 at the rate of 2,900 parts. In contrast to the initial slurry, or reaction product mixture fed to the system, the ethyl chloride content is only 2.4 or less percent. In addition, the slurry includes approximately two-thirds water, 16 percent lead, and over 7 percent tetraethyllead. The slurry is characterized by virtually complete solution of the sodium chloride formed in the reaction in the aqueous phase.

In contrast to the vaporizing section, the stills 21, 22, 23 are operated at virtually atmospheric or only slightly supraatmospheric pressure, of the order of 1 to 3 pounds per square inch.

The feed to the distillation system as above noted includes approximately 4.5 parts of water solution to one part of the insoluble excess lead. The maintenance of this liquid:solid ratio is desirable particularly in such continuous embodiments in that rapid and easy flow of the slurry through the several vessels and transfer lines 31, 32, 33 is thereby facilitated. Steam is passed through several stills in lines 34, 35, 36 and in the overall proportions of approximately the weight ratio of 2.5:1, steam: slurry. The tetraethyllead is thereby separated in vapor form from the lead particles and is discharged from the stills through the overhead lines 37, 38, 39 and manifolded by line 40 for transmission to the condenser 62. At this point, the condenser 62 makes a fractional condensation which condenses almost completely the tetraethyllead content of the vapor but only a minute fraction of the initially small amount of the ethyl chloride. The still condenser is operated to deliver the condensed liquid at approximately 200° F., the condensate being discharged through line 63 to subsequent washing and purifying operation. The condensate consists of 99 percent or better purity tetraethyllead. Vapor from the condenser 62 is passed through line 64 to a compressor 61 for again raising the pressure to slightly above the operating pressure of the preceding vaporizer 1. The compression is desirably effected in compressors of the rotating type employing an ovoid and circulating body of liquid as a seal. These compressors are commonly referred to as "Nash" compressors. Hot water, preheated to a temperature to the order of 170° F. is concurrently added through line 70 in the weight proportions of approximately 7:1, as the seal liquid. The discharge from the compressor 61 thus includes a mixed liquid-vapor stream which is recirculated to the vaporizer 1 through line 4. A vent line 68 provides for venting of uncondensed gases, the venting being controlled by a pressure actuated valve 67.

The discharge liquid from the condenser 62 includes 200 parts of tetraethyllead, amounting to approximately 80 percent of the tetraethyllead present in the feed stream 2 to the system. Substantially all the remainder of the tetraethyllead originally fed to the system is incorporated in the recovered ethyl chloride stream 60 withdrawn from the bottom of the column 52 and returned to the alkylation reaction.

Having fully described the process and the best manner of its operation; what is claimed is:

1. In the recovery of a tetraalkyllead from an alkylated slurry mixture produced in a pressurized alkylation, the slurry including excess alkyl chloride, a tetraalkyllead having alkyl groups containing up to 3 carbon atoms, and alkylated solids comprising finely divided lead and sodium chloride, the process comprising vaporizing the alkyl chloride at a pressure approximately midway between the alkylation pressure and atmospheric pressure and steam distilling the tetraalkyllead from the solids at substantially atmospheric pressure.

2. In the recovery of a tetraalkyllead from an alkylated slurry mixture produced in a pressurized alkylation, the slurry including excess alkyl chloride, a tetraalkyllead having alkyl groups containing up to 3 carbon atoms, and alkylated solids comprising finely divided lead and sodium chloride, the process comprising vaporizing the alkyl chloride at a pressure approximately midway between the alkylation pressure and atmospheric pressure in the presence of an aqueous solution of an antiagglomerant for the lead particles, and concurrently dissolving the sodium chloride in the aqueous solution, then steam distilling the tetraalkyllead from the solids at substantially atmospheric pressure.

3. A process of recovering a tetraalkyllead the alkyl groups thereof having up to 3 carbon atoms from an alkylation mixture formed at an elevated pressure and comprising a thin slurry of finely divided particles of lead and sodium chloride in a liquid solution of the tetraalkyllead in alkyl chloride, comprising; feeding together the slurry, a recycled sodium chloride solution from a point hereafter defined, an antiagglomerant for the lead particles and water, the recycled sodium chloride solution and water being sufficient to provide an aqueous phase at least equal to two parts by weight to one part of lead, vaporizing the alkyl chloride at an elevated pressure without appreciably vaporizing the tetraalkyllead, said pressure being approximately midway between the alkylation pressure and atmospheric pressure; separating the alkyl chloride vapors so formed and the resultant slurry; and steam distilling tetraalkyllead from said slurry at substantially atmospheric pressure, thereby forming a slurry consisting essentially of finely subdivided lead in aqueous sodium chloride solution; separating the lead therefrom; and recycling a portion of the sodium chloride solution above defined.

4. A process of recovering tetraethyllead from an ethylation mixture formed at an elevated pressure and comprising a thin slurry of finely divided particles of lead and sodium chloride in a liquid solution of the tetraethyllead in excess ethyl chloride comprising; feeding together the said slurry, a recycled sodium chloride solution from a point hereafter defined, an antiagglomerant for the lead particles and water, the sodium chloride solution and water being apportioned to provide an aqueous phase in the proportions of at least four parts of aqueous phase to one part of lead; heating and vaporizing the ethyl chloride at an elevated pressure without appreciable vaporization of the tetraethyllead, said pressure being approximately midway between the ethylation pressure and atmospheric pressure; separating the ethyl chloride vapors so formed and the resultant slurry, steam distilling tetraethyllead from said slurry at substantially atmospheric pressure, thereby forming a slurry consisting essentially of finely subdivided lead in sodium chloride solution; separating the lead therefrom; and recycling a portion of the sodium chloride solution as above defined.

5. A process of recovering tetraethyllead from an ethylation mixture formed at an elevated pressure and including finely divided particles of lead and sodium chloride in a liquid solution of the tetraethyllead in excess ethyl chloride, comprising; (a) feeding together the slurry, a recycled sodium chloride solution from a point hereafter defined, a mixed vapor-liquid stream of ethyl chloride and water from a point hereafter defined and an antiagglomerant for the lead particles; concurrently passing steam into the mixture so formed and vaporizing therefrom, at an elevated pressure, the ethyl chloride without appreciable vaporization formed at an elevated pressure and including the tetraethyllead, said pressure being approximately midway between the ethylation pressure and atmospheric pressure; and separating the ethyl chloride vapors so formed and the resultant slurry; and (b) steam distilling the tetraethyllead from said slurry at substantially atmospheric pressure forming thereby a vapor including the tetraethyllead, steam and minor amounts of ethyl chloride, and a slurry of finely divided lead in sodium chloride solution; condensing the tetraethyllead from said vapor stream, recompressing the uncondensed vapors to at least the pressure of operation employed in the vaporizing step in (a), while adding water thereto, thereby forming the mixed vapor liquid stream of ethyl chloride and water; feeding said stream to the operation defined in (a); settling the lead from the slurry of lead in sodium chloride solution and recycling a portion of the solution to the operation defined in (a).

6. The process for the manufacture and recovery of tetraethyllead comprising continuously ethylating, at an elevated pressure a sodium lead alloy with liquid ethyl chloride in the proportions of at least two parts of ethyl chloride to one part of alloy, thereby forming an ethylated slurry including excess ethyl chloride, tetraethyllead dissolved therein, and finely divided solids including lead and sodium chloride; vaporizing the ethyl chloride at a pressure approximately midway between the ethylation pressure and atmospheric pressure, and in the presence of a lead antiagglomerant and at least two parts of water to one part of lead, thereby forming an ethyl chloride vapor with only minute proportions of tetraethyllead, and a slurry comprising lead, tetraethyllead and sodium chloride dissolved in water; then steam distilling the tetraethyllead from said slurry at approximately atmospheric pressure.

7. A process for the manufacture and recovery of a tetraalkyllead the alkyl groups thereof having up to 3 carbon atoms comprising alkylating a sodium metal alloy of lead with liquid alkyl chloride in weight proportions of at least 2:1 alkyl chloride:alloy and at a pressure sufficient to maintain the alkyl chloride in the liquid phase, forming thereby an alkylated slurry including excess alkyl chloride, tetraalkyllead dissolved therein and finely divided particles including lead and sodium chloride, passing said slurry to a vaporizing zone and agitating therein with a recycled aqueous sodium chloride solution from a point hereafter defined and in the presence of an antiagglomerant for the lead; concurrently vaporizing the excess alkyl chloride at a pressure approximately midway between the pressure of alkylation and atmospheric pressure without appreciable vaporization of the tetraalkyllead, thereby forming a vapor phase and a slurry comprising tetraalkyllead, lead, and a sodium chloride solution; separating the vapor phase and discharging the slurry to a distillation zone and steam distilling the tetraalkyllead from the slurry at substantially atmospheric pressure, thereby forming a slurry of finely divided lead in sodium chloride solution, discharging the so formed slurry to a settling zone and settling the lead therefrom and recycling a portion of the lead free sodium chloride solution to the vaporizing zone.

8. A continuous process for the manufacture and recovery of tetraethyllead comprising ethylating monosodium lead alloy with liquid ethyl chloride in weight proportions of at least 4:1, ethyl chloride:alloy and at a pressure of approximately 90 to 110 pounds per square inch, forming thereby an ethylated slurry including excess ethyl chloride, tetraethyllead dissolved therein, and finely divided solids including lead and sodium chloride, passing the slurry to a vaporizing zone and agitating therein with a recycled aqueous sodium chloride solution hereafter defined and a recycled water-ethyl chloride mixture hereafter defined; concurrently vaporizing the excess ethyl chloride at a pressure of about 50 pounds per square inch without appreciable vaporization of the tetraethyllead, separately withdrawing the vapor phase and a slurry comprising the tetraethyllead, lead, and sodium chloride solution; passing the slurry to a multi series stage distilling zone and steam distilling the tetraalkyllead from the slurry at substantially atmospheric pressure while agitating therein only sufficiently to maintain the solids in nonuniform distribution in each of said stages and discharging the slurry from each stage at a point remote from the bottom thereof; condensing the tetraethyllead from the overhead vapor stream; recompressing the uncondensed vapors while adding water thereto and recycling the so formed liquid-vapor stream to the vaporizing zone; discharging the steam distilled slurry from the last stage of the distilling zone and separating the lead therefrom; and recycling a portion of the so-formed sodium chloride solution to the vaporizing zone.

9. In the continuous recovery of a tetraalkyllead the alkyl groups thereof having up to 3 carbon atoms from an alkylated slurry mixture produced in a pressurized alkylation, the slurry including excess alkyl chloride, tetraalkyllead, and reacted solids; said solids comprising finely divided lead solids and sodium chloride; the improvement comprising vaporizing the excess alkyl chloride in the presence of an aqueous solution of an antiagglomerant for the lead solids, said vaporizing being at a pressure approximately midway between the alkylation pressure and atmospheric pressure, thereby forming a slurry of the lead solids, tetraalkyllead and the aqueous solution; continuously feeding the slurry to a steam distilling zone and agitating therein only sufficiently to maintain the lead solids in nonuniform distribution in the aqueous phase while steam distilling the tetraalkyllead, and withdrawing at a point remote from the bottom of the stream distilling zone a slurry having less tetraalkyllead than the slurry within the zone.

References Cited in the file of this patent

UNITED STATES PATENTS

| | | |
|---|---|---|
| 2,411,453 | Mitchell et al. | Nov. 19, 1946 |
| 2,513,654 | Krohn | July 4, 1950 |
| 2,513,659 | Madden | July 4, 1950 |
| 2,644,827 | Neher et al. | July 7, 1953 |